US007289968B2

(12) United States Patent
Ferreri et al.

(10) Patent No.: US 7,289,968 B2
(45) Date of Patent: Oct. 30, 2007

(54) FORECASTING DEMAND FOR CRITICAL PARTS IN A PRODUCT LINE

(75) Inventors: Anthony V. Ferreri, Hyde Park, NY (US); Barun Gupta, Shelton, CT (US); George W. Reiche, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 1279 days.

(21) Appl. No.: 09/943,834

(22) Filed: Aug. 31, 2001

(65) Prior Publication Data

US 2003/0046191 A1    Mar. 6, 2003

(51) Int. Cl.
    G06Q 10/00     (2006.01)
(52) U.S. Cl. .................... 705/28; 705/10; 364/468; 700/9; 700/106
(58) Field of Classification Search ............... 705/28, 705/10; 364/468; 700/9, 106
    See application file for complete search history.

(56) References Cited

U.S. PATENT DOCUMENTS

| | | | |
|---|---|---|---|
| 5,168,445 A * | 12/1992 | Kawashima et al. ......... 705/10 |
| 5,295,067 A | 3/1994 | Cho et al. .................. 700/106 |
| 5,796,614 A * | 8/1998 | Yamada ...................... 700/106 |
| 5,960,414 A | 9/1999 | Rand et al. .................... 705/22 |
| 6,594,535 B1 * | 7/2003 | Costanza ...................... 700/97 |
| 7,058,587 B1 * | 6/2006 | Horne ............................ 705/7 |
| 2004/0236641 A1 * | 11/2004 | Abbott et al. ................ 705/28 |

FOREIGN PATENT DOCUMENTS

WO    WO 94/01826    *    1/1994

OTHER PUBLICATIONS

Millen, Anne, "Is 'leadtime' and endangered word," Sep. 23, 1993, Purchasing, vol. 115, No. 4. pp. 2.*

* cited by examiner

Primary Examiner—F. Zeender
Assistant Examiner—Asfand M. Sheikh
(74) Attorney, Agent, or Firm—Gibb & Rahman, LLC; Derek S. Jennings

(57) ABSTRACT

A method of forecasting the demand for components used to manufacture a plurality of different devices is presented. The method determines a production quantity of each of the devices planned to be manufactured, analyzes each of the devices to produce exploded lists of components required to manufacture each of the devices and device assemblies, multiplies the list of components required for each device by each the production quantity to determine a total volume of each component required to manufacture the devices, identifies components as ones having a level of supply insufficient to meet demand and having no available substitute components, and calculates a volume of each critical component required to manufacture the devices based on the total volume of each component.

18 Claims, 4 Drawing Sheets

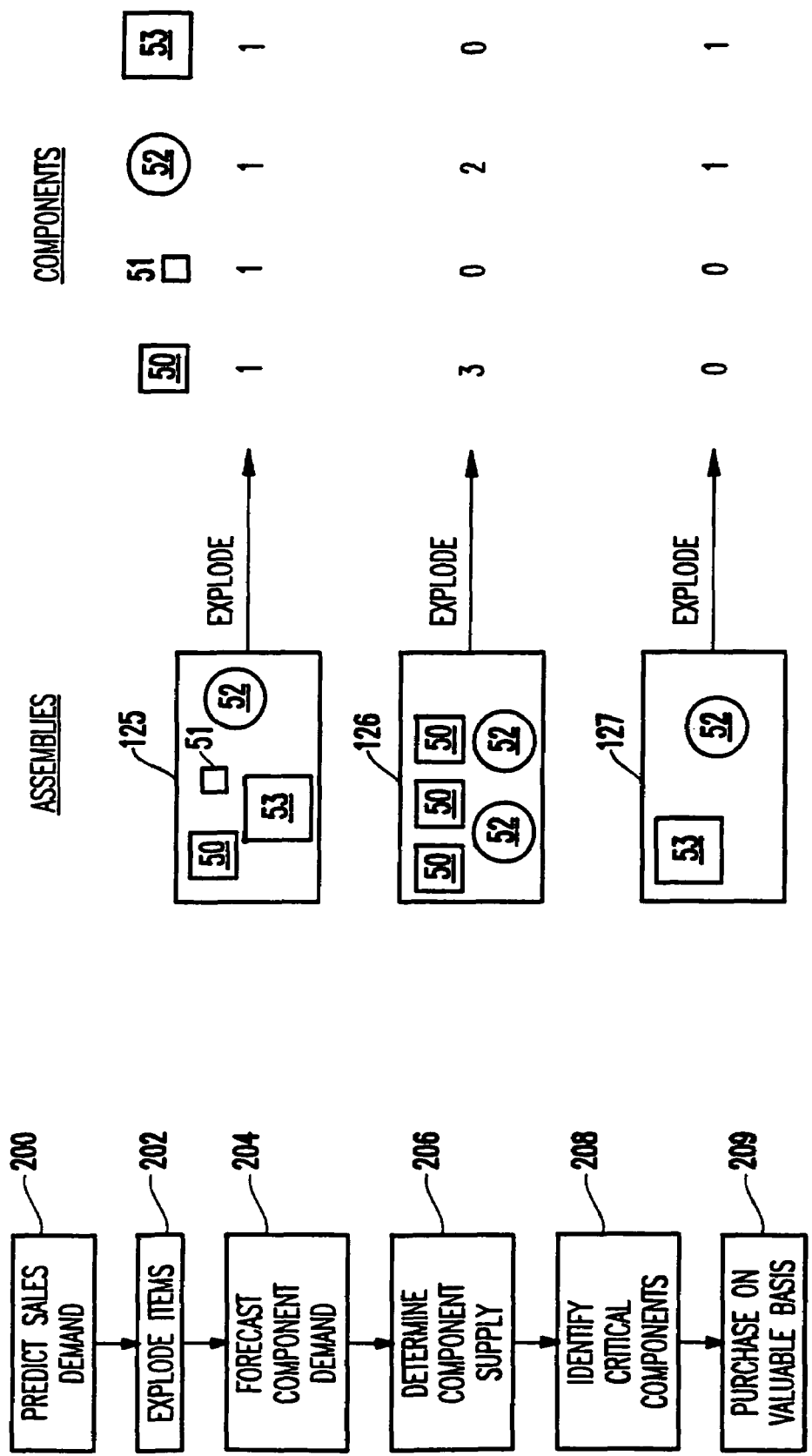

|  | PAST DUE | WEEK 1 | WEEK 2 | WEEK 3 | WEEK 4 | WEEK 5 | WEEK 6 | TOTAL |
|---|---|---|---|---|---|---|---|---|
| FORECAST FOR SALES ITEM | | 100 | 250 | 400 | 300 | 650 | 450 | 2150 |
| EXPLODED FORECAST FOR COMPONENT WITH MIN PROFILE | | 100 | 250 | 400 | 300 | 650 | 450 | 2150 |
| EXPLODED FORECAST FOR COMPONENT WITHOUT MIN PROFILE | 1050 | 1100 | | | | | | 2150 |

FIG.3

FORECASTING DEMAND FOR CRITICAL PARTS IN A PRODUCT LINE

BACKGROUND OF THE INVENTION

1. Field of the Invention

The present invention generally relates to a method of forecasting of the number of critical parts that will be required to produce a line of products. A key feature of the invention is the exploding of purchased complete assemblies which allows a precise forecast of the content (components) within the assemblies. These content forecasts are provided to component vendors that provide these components to the assembly vendors.

2. Description of the Related Art

In today's high technology manufacturing environment, each product produced comprises hundreds if not thousands of individual components purchased from almost as many suppliers. In addition, it is very common for one component to be shared by a number of different products.

One constant problem faced by manufacturers is estimating the correct number of components to buy, especially considering that many components are shared between different machines and that each component may easily be substituted with different but similar components. For example, when manufacturing personal computers, it is common to utilize hard disks as storage devices. It is common to use the same hard disk in a variety of finished products. In addition, while one hard disk from a specific manufacturer may be preferred, other similar hard disks may be substituted without affecting the quality of the final product.

Another issue associated with correctly estimating the number of different components required to produce today's devices relates to the bargaining power a buyer may present depending upon the volume of products they desire to purchase. Generally, as a greater volume is purchased, the price per unit decreases. Therefore, it is important for organizations to identify situations where they can purchase items in high volume so as to reduce their per unit cost.

A corporate procurement department may purchase millions of assembly and component parts each year to support it's manufacturing businesses. Based on this high volume activity, the corporation can force much leverage to gain price breaks. In order to gain these price breaks, the company must be able to accurately forecast its intentions to buy parts. The higher the volume, the better the price break.

Therefore, there is a need for an automated system that allows a manufacturer the ability to purchase only the components that are required, and to take advantage of volume buying whenever possible. The invention below describes such a system that is user friendly and effective.

SUMMARY OF THE INVENTION

In view of the foregoing and other problems, disadvantages, and drawbacks of the conventional component ordering systems, the present invention has been devised, and it is an object of the present invention to provide a structure and method for an improved component ordering/forecasting system.

In order to attain the object(s) suggested above, there is provided, according to one aspect of the invention, a method of forecasting the demand for components used to manufacture different devices (end items). the method determines a production quantity of each device planned to be manufactured and analyzes each of the devices to produce an exploded list of purchased complete assemblies. This list of purchased complete assemblies required to manufacture the devices, is then multiplied by the list of components required for each purchased complete assembly, to determine the total volume of each component. The method then identifies components as having a level of supply insufficient to meet demand and having no available substitute component and calculates a volume of each component required to manufacture the purchased complete assemblies.

The process of determining a production quality comprises forecasting sales volumes for each of the device and subtracting available inventory of the devices from the sales volume. The devices may share one or more of the components. Further, the invention identifies substitute components that can be used in place of identified components.

The invention provides the ability to play "what if" scenarios and turns off all the optional parameters and only utilizes the minimal required parameters (min profile) for the MRP (materials requirement planning) explode process. The min profile process provides the users with a better understanding of the effects of machine build plan changes or parameter changes on components lower in the BOM (Bill of Material) structure.

BRIEF DESCRIPTION OF THE DRAWINGS

The foregoing and other objects, aspects and advantages will be better understood from the following detailed description of a preferred embodiment(s) of the invention with reference to the drawings, in which:

FIG. 1B is a schematic diagram of components making up assemblies;

FIG. 2 is a flow diagram illustrating a preferred method of the invention;

FIG. 3 is a table describing forecasting sales volumes; and

DETAILED DESCRIPTION OF PREFERRED EMBODIMENTS OF THE INVENTION

Figure 1A:
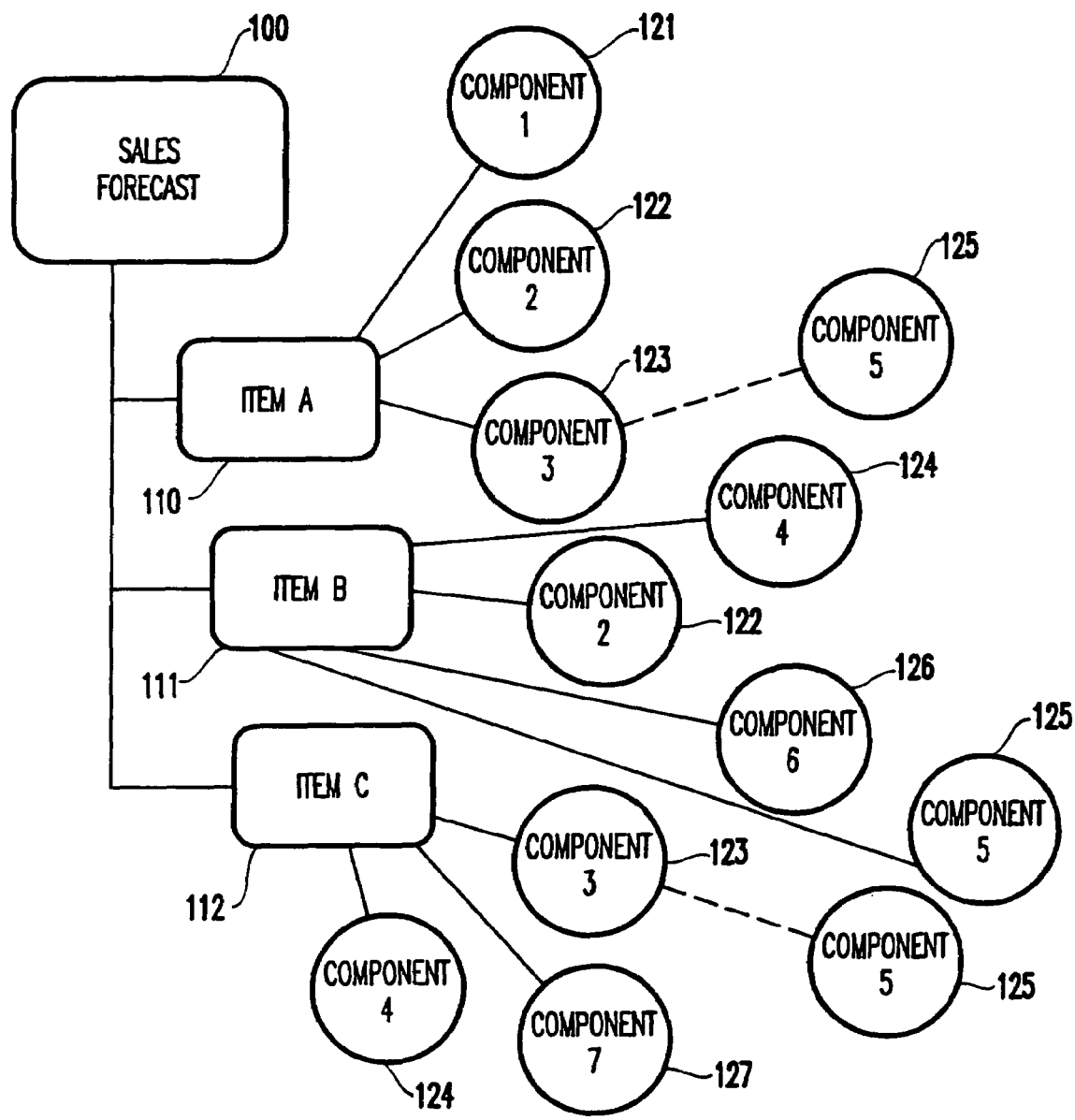
FIG. 1A is a schematic diagram showing the relationship between sales forecasts, production items and components.

As mentioned above, corporate procurement department may purchase millions of assembly and component parts each year to support it's manufacturing businesses. Based on this high volume activity, the corporation can force much leverage to gain price breaks. In order to gain these price breaks, the company must be able to accurately forecast its intentions to buy parts. The higher the volume, the better the price break.

Corporations often out-source the construction of assemblies to external organizations (that are referred to herein as "assembly vendors") in order to reduce costs. The assembly vendors in turn purchase e components from component manufacturers (that are referred to herein as "component vendors"). Conventional planning programs treat the assemblies purchased from assembly vendors as individual components (e.g., non-divisible units). This invention allows purchased complete assemblies to be exploded through its bill of material to determine the component volumes. This process then aggregates the component volumes from different purchased complete assemblies and the resulting information is provided to the procurement organization, as well as the component vendor and the assembly vendor. This enables the assembly vendor to reduce his cost for the assembly based on the volume discount that the assembly vendor can now get from the component vendor. In other words, the invention first determines production quantities of devices planned to be manufactured. Next, the invention explodes each of the devices into first level components to generate required first level component volumes. The first level components can include some assemblies. The invention multiplies the first level component volumes for each device by a corresponding production quantity to determine a total volume of first level components that are required. This total volume of first level components may include assembly volumes. Next, the invention explodes each of the assemblies into assembly components to generate required assembly component volumes for each assembly. Also, the invention multiplies the assembly component volumes for each assembly by a corresponding assembly volume to determine a total volume of assembly components required. Then, the invention can provide the total volume of assembly components required to assembly component manufacturers.

The inventors determined that even larger volume price discounts can be obtained if the MRP calculates the demand for the individual components that make up multiple assemblies (e.g., the assembly components). By using such information, volume pricing discounts can be obtained from the component vendors. These volume pricing discounts can be passed on to the assembly vendors and translated into reduced assembly prices. As explained in greater detail below, an important feature of the invention is that it explodes the assemblies to determine individual component demand that can be used to obtain volume price discounts of the various components that make up an assembly, thereby making the assemblies less expensive. Thus, with the invention, the corporation can purchase assemblies at lower cost if it can forecast and leverage the component content within the assembly and gain price breaks from the component vendors for the benefit of the assembly vendors.

The invention provides a function within a Part Requirements Planning (PRP) engine, which explodes assemblies and reports the component demand directly to the component vendors. This invention achieves an advantage by saving money on components that make up completed assemblies.

FIG. 1A illustrates one embodiment of the invention that provides such a forecast. More specifically, in item 100, the sales forecasts are made for different items that are manufactured. The calculation of the forecast in item 100 is performed by collecting sales orders, projections, and historical trends to estimate the individual demand for each item that will be manufactured. As shown in FIG. 1A, this translates to production quantities for different finished production items (e.g., computers, portable electronic devices, etc.) such as items A-C (110-112).

Each of the items is made up of a number of components 121-127, some of which may be assemblies. Some of the components are used by more than one item. For example, component 3 (123) is shared by item A (110) and item C (112). In addition, some items are acceptable substitutes for other items. For example, component 5 (125) is an acceptable substitute for component three (123) as indicated by the dashed lines in FIG. 1A.

FIG. 1B illustrates three of the components 125-127 (components 5-7) in greater detail. In this example, these components are assemblies 125-127 that are each made up of assembly components 50-53. As shown in FIG. 1B, the explode process determines that assembly 125 includes one each of components 50-53. Assembly 126 includes three of component 50 and two of component 52. Assembly 127 includes one component 52 and one component 53.

An important aspect is that the invention performs the explode process on the assemblies that are manufactured by a different entity or entities (e.g., the assembly vendor(s)). This allows the assembly vendors to obtain higher volume price discounts than they could on their own. For example, each of the assemblies 125-127 could be manufactured by a different assembly vendor. Each assembly vendor may purchase a component (e.g., component 52) from the same component vendor. However, because each individual assembly vendor is purchasing on their own, they will each purchase a lower volume of component 52 when compared to the volume of component 52 that all three assembly vendors will purchase combined. By purchasing the component 52 individually, the assembly vendors individually receive a lower volume discount. This translates into higher costs for each of the assemblies 125-127.

To the contrary, with the invention, the manufacturing corporation (which is the final consumer of the assemblies 125-127) can provide information to the non-related, external component vendor (e.g., a different manufacturer) regarding the volume of component 52 that will be purchased. This information allows the three different assembly vendors to pad their resources and each purchase the component 52 from the selected component vendor and each obtain the volume pricing discounts based upon all the components 52 that will be utilized in each of the different assemblies 125-127.

As mentioned above, conventional planning programs only perform analysis on components that the manufacturing corporation will purchase (e.g., raw materials, manufactured components, assemblies, etc.). Therefore, conventional planning programs do not explode the components that make up assemblies purchased from external sources (e.g., from assembly vendors). As a result, conventionally the assembly vendors could not take the advantage of the volume pricing discounts that are available with the invention. In other words, the invention allows different external assembly vendors to combine their purchasing power to purchase components that will make up the assembly at lower prices (through higher volume pricing discounts).

An operational aspect of the invention is shown in FIG. 2 in flowchart form. As shown in item 200, the sales demand for each item 110-112 is predicted, as discussed above. Also, the invention explodes the items (in item 202) to break each item down into its constituent components 121-127.

In item 204, the invention forecasts the demand for each component 121-127, and assembly component 50-53. In one embodiment, this simply involves multiplying the sales forecast (for each item 110-112 that the component 121-127 will be included in) to determine the total number of each component 121-127 that will be needed to manufacture the forecasted number of items 110-112. In addition, the invention also determines what components/assemblies the corporation has in inventory and reduces the forecasted component demand 204 by the amount of items in inventory. Similarly, if substitute components/assemblies are available in inventory, they can also reduce the forecasted component demand for a given component.

Referring again to FIG. 2, after determining the demand for different components, the invention determines the available supply of each component by reviewing information of available inventory information from various suppliers regarding previous quotes on their ability to provide each component. When the demand for a given component exceeds the supply of that component (and no ready substitute exists for the component) then the component is classified as a "critical" component in item 208. By identifying critical components, the invention alerts the procurement operations of the corporation that particular attention must be paid to ensure adequate supply of the critical components.

FIG. 3 illustrates the operation of the MRP explode process with reference to one of the items shown in FIG. 1A (e.g., item A). The sales forecasts for a particular item is shown in the first row and illustrates the various sales that are expected during weeks 1-6. Through the entire 6 week period, the total sales forecast for that item totals 2,150. By exploding the sales forecast for a particular component included within the item in the first row, the demand for a given component would also be known on a weekly basis and in total. The demand value for this component would be added to other demand values for that component, if different products used that component. To the contrary, without the inventive min profile process, all that is known is that a certain amount of the component is past due and another amount will be due at some time in the future. Therefore, as shown in FIG. 3, the invention provides much more detail than the conventional systems.

Figure 4:
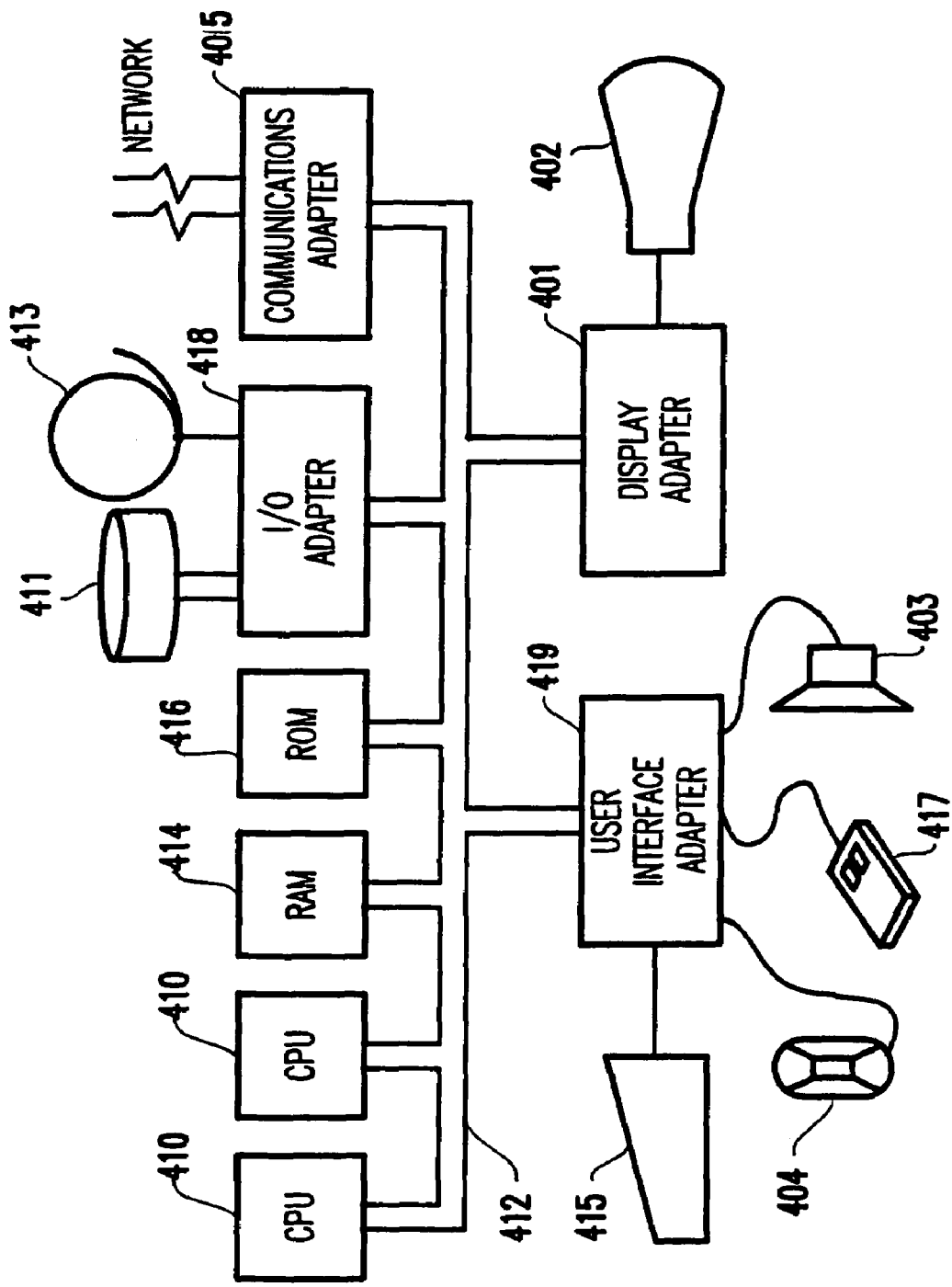
FIG. 4 is a hardware embodiment of a computer system for executing the invention.

A representative hardware environment for practicing the present invention is depicted in FIG. 4, which illustrates a typical hardware configuration of an information handling/computer system in accordance with the subject invention, having at least one processor or central processing unit (CPU) 410. CPUs 410 are interconnected via system bus 412 to random access memory (RAM) 414, read-only memory (ROM) 416, an input/output (I/O) adapter 418 for connecting peripheral devices, such as disk units 411 and tape drives 413, to bus 412, user interface adapter 419 for connecting keyboard 415, mouse 417, speaker 403, microphone 404, and/or other user interface devices such as touch screen device (not shown) to bus 412, communication adapter 405 for connecting the information handling system to a data processing network, and display adapter 401 for connecting bus 412 to display device 402. A program storage device readable by the disk or tape units, is used to load the instructions which operate on the invention which is loaded onto the computer system.

An important feature of the invention is that it considers the ability of one component to substitute for another component, as is shown with respect to components 123, 125 in FIG. 1A. This ability allows the invention to potentially increase its volume purchasing, and thereby decrease the price paid per unit for a given components (item 209). For example, as shown in FIG. 1A, component 5 (125) is used in item B (111). In addition, component 5 (125) is a substitute component for component three (123) that is used in item A (110) and item C (112). The invention recognizes this potential substitution and to provide increased volume discounts with respect to component 5 (125), the invention substitutes component 5 (125) with component three (123) and uses component 5 (125) in place of component three (123) in item A (110) and item C (112).

In addition, to make the component forecast more easily understood in actual volumes, a "min-profile" technique is used to remove all ordering parameters, which tend to distort the actual needs with order sizes, minimums, maximums, etc. MRP (Materials Requirement Planning) programs use many explode parameters, such as leadtime, transit time, order sizing, etc. Leadtimes and Transit times offset the demands for all components, thus making their demand earlier in time to compensate for the time it takes to build and transport parts. These offset days, at multiple levels, will vary depending on the supplier location and type of transportation used, thereby more accurately tracking true demand and impact from top schedule changes. In addition, order sizing parameters group the demand at all levels to provide an economical purchase quantity. A component's physical size as well as it's dollar value will affect the lot size quantities. Typically, large or high dollar parts will be packaged in smaller order size quantities, as the inventory costs are greater. When making a parameter change, many other variables are affected in determining the calculated parts requirements.

Therefore, in one embodiment, the invention provides the min-profile feature to create the ability to play "what if" scenarios. The min-profile feature provides the ability to turn off all the optional parameters, and only utilize the minimal required parameters (min-profile) for the MRP explode. The min-profile process provides the users with a better understanding of the effects of machine build plan changes or parameter changes on components lower in the BOM (Bill of Material) structure. This is done by reviewing the existing machine build plan dates and quantities 200, reviewing the total requirements (exploded through the structure) of a particular part number 202, changing the machine build plan quantities or another parameter, and reviewing the critical part number which was previously calculated. This allows the net quantity change to be more clearly understood. This is particularly important, for parts that are constrained or have excess inventory.

Benefits which flow from the invention include a clearer understanding of demand churn, which is not a result of parameter settings or changes. Also, the invention allows for the procurement of price breaks, as a result of aggregate volume forecast for suppliers and an improved forecast validation technique, which increases forecast accuracy. More specifically, with the invention, the manufacturing corporation can provide information to the non-related, external component vendor regarding the volume of components that will be purchased from the component vendor. This information allows different assembly vendors to purchase components from a component vendor at volume pricing discounts based upon all the components that will be utilized by each of the different assembly vendors. The improved forecast validation technique, also saves commodity managers time, reduces inventory at suppliers and manufacturing locations, and also allows manufacturing to be more responsive to customer orders.

While the invention has been described in terms of preferred embodiments, those skilled in the art will recognize that the invention can be practiced with modification within the spirit and scope of the appended claims.

What is claimed is:

1. A method of forecasting component requirements for devices being manufactured, said method comprising:

determining production quantities of devices planned to be manufactured;

exploding each of said devices planned to be manufactured into first level components to generate required first level component volumes, wherein said first level components include assemblies;

multiplying said first level component volumes for each device by a corresponding production quantity of said production quantities to determine a total volume of first level components required, wherein said total volume of first level components includes assembly volumes;

exploding each of said assemblies into assembly components to generate required assembly component volumes for each assembly;

multiplying said assembly component volumes for each assembly by a corresponding assembly volume of said assembly volumes to determine a total volume of assembly components required;

providing said total volume of assembly components required to assembly component manufacturers; and performing a minimum profile technique that removes specific ordering parameters consisting of at least order minimums, order maximums, leadtimes, transit times, and order sizing, wherein said devices planned to be manufactured share one or more of said components and said assemblies share one or more of said assembly components.

2. The method in claim 1, wherein said process of determining a production quantity comprises forecasting sales volumes for each of said devices planned to be manufactured.

3. The method in claim 1, further comprising, before said providing of said total volume of assembly components required, identifying substitute components.

4. The method in claim 1, wherein some of said components comprise critical components.

5. The method in claim 4, wherein said critical components comprise components having a level of supply insufficient to meet demand and having no available substitute components.

6. A method of forecasting component requirements for devices being manufactured, said method comprising:

determining production quantities of devices planned to be manufactured;

exploding each of said devices planned to be manufactured into first level components to generate required first level component volumes, wherein said first level components include assemblies;

multiplying said first level component volumes for each device by a corresponding production quantity of said production quantities to determine a total volume of first level components required, wherein said total volume of first level components includes assembly volumes;

exploding each of said assemblies into assembly components to generate required assembly component volumes for each assembly;

multiplying said assembly component volumes for each assembly by a corresponding assembly volume of said assembly volumes to determine a total volume of assembly components required;

identifying critical components and critical assembly components as ones having levels of supply insufficient to meet demand and having no available substitute components;

calculating a volume of each critical component and critical assembly component required to manufacture said devices planned to be manufactured based on said total volume; and performing a minimum profile technique that removes specific ordering parameters consisting of at least order minimums, order maximums, leadtimes, transit times, and order sizing, wherein said devices planned to be manufactured share one or more of said components and said assemblies share one or more of said assembly components.

7. The method in claim 6, wherein said process of determining a production quality comprises forecasting sales volumes for each of said devices planned to be manufactured.

8. The method in claim 6, further comprising, before said providing of said total volume of assembly components required, identifying substitute components.

9. A method of forecasting component requirements for devices being manufactured, said method comprising:

determining production quantities of devices planned to be manufactured;

exploding each of said devices planned to be manufactured into first level components to generate required first level component volumes, wherein said first level components include assemblies;

multiplying said first level component volumes for each device by a corresponding production quantity of said production quantities to determine a total volume of first level components required, wherein said total volume of first level components includes assembly volumes;

exploding each of said assemblies into assembly components to generate required assembly component volumes for each assembly;

multiplying said assembly component volumes for each assembly by a corresponding assembly volume of said assembly volumes to determine a total volume of assembly components required; and performing a minimum profile technique that removes specific ordering parameters consisting of at least order minimums, order maximums, leadtimes, transit times, and order sizing, wherein said devices planned to be manufactured share one or more of said components and said assemblies share one or more of said assembly components.

10. The method in claim 9, wherein said process of determining a production quantity comprises forecasting sales volumes for each of said devices planned to be manufactured.

11. The method in claim 9, further comprising, before said providing of said total volume of assembly components required, identifying substitute components.

12. The method in claim 9, wherein some of said components comprise critical components.

13. The method in claim 12, wherein said critical components comprise components having a level of supply insufficient to meet demand and having no available substitute components.

14. A program storage device readable by machine tangibly embodying a program of instructions executable by said machine for performing a method of forecasting component requirements for devices being manufactured, said method comprising:

determining production quantities of devices planned to be manufactured;

exploding each of said devices planned to be manufactured into first level components to generate required first level component volumes, wherein said first level components include assemblies;

multiplying said first level component volumes for each device by a corresponding production quantity of said production quantities to determine a total volume of first level components required, wherein said total volume of first level components includes assembly volumes;

exploding each of said assemblies into assembly components to generate required assembly component volumes for each assembly;
multiplying said assembly component volumes for each assembly by a corresponding assembly volume of said assembly volumes to determine a total volume of assembly components required;
providing said total volume of assembly components required to assembly component manufacturers; and
performing a minimum profile technique that removes specific ordering parameters consisting of at least order minimums, order maximums, leadtimes, transit times, and order sizing,
wherein said devices planned to be manufactured share one or more of said components and said assemblies share one or more of said assembly components.

15. The program storage device in claim 14, wherein said process of determining a production quality comprises forecasting sales volumes for each of said devices planned to be manufactured.

16. The program storage device in claim 14, further comprising, before said providing of said total volume of assembly components required, identifying substitute components.

17. The program storage device in claim 14, wherein some of said components comprise critical components.

18. The program storage device in claim 17, wherein said critical components comprise components having a level of supply insufficient to meet demand and having no available substitute components.

* * * * *